United States Patent
Hsu

(10) Patent No.: US 7,480,887 B1
(45) Date of Patent: Jan. 20, 2009

(54) METHODS AND APPARATUS FOR DEFINING MANHATTAN POWER GRID STRUCTURES BENEFICIAL TO DIAGONAL SIGNAL WIRING

(75) Inventor: Hengfu Hsu, Cupertino, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 440 days.

(21) Appl. No.: 11/339,330

(22) Filed: Jan. 23, 2006

Related U.S. Application Data

(63) Continuation of application No. 10/452,100, filed on Jun. 1, 2003, now Pat. No. 7,003,748.

(51) Int. Cl.
*G06F 17/50* (2006.01)

(52) U.S. Cl. .................. 716/13; 716/8; 716/9; 716/10; 716/11; 716/12; 716/14

(58) Field of Classification Search ............... 716/8–14, 716/1
See application file for complete search history.

(56) References Cited

U.S. PATENT DOCUMENTS

| | | | |
|---|---|---|---|
| 5,767,011 A * | 6/1998 | Yao et al. ..................... | 438/618 |
| 6,086,627 A | 7/2000 | Bass et al. | |
| 6,111,756 A | 8/2000 | Moresco | |
| 6,202,191 B1 * | 3/2001 | Filippi et al. .................... | 716/5 |
| 6,305,000 B1 * | 10/2001 | Phan et al. ...................... | 716/5 |
| 6,308,307 B1 | 10/2001 | Cano et al. | |
| 6,385,758 B1 | 5/2002 | Kikuchi et al. | |
| 6,388,332 B1 * | 5/2002 | Aggarwal et al. ............ | 257/774 |
| 6,421,819 B1 | 7/2002 | Masukawa | |
| 6,437,431 B1 | 8/2002 | Mbouombouo et al. | |
| 6,446,245 B1 | 9/2002 | Xing et al. | |
| 6,467,074 B1 * | 10/2002 | Katsioulas et al. ............ | 716/17 |
| 6,484,293 B1 | 11/2002 | Starr | |
| 6,523,154 B2 * | 2/2003 | Cohn et al. ..................... | 716/6 |

(Continued)

FOREIGN PATENT DOCUMENTS

WO   WO 2004/109753   12/2004

OTHER PUBLICATIONS

Moulton, "Laying the Power and Ground Wires on a VLSI Chip", IEEE 20th Design Automation Conference, Technical Digest pp. 754-755.*

(Continued)

*Primary Examiner*—Sun J Lin
(74) *Attorney, Agent, or Firm*—Adeli & Tollen LLP

(57) ABSTRACT

A method for defining and producing a power grid structure of an IC that minimizes the area of the power grid structure area and the diagonal wiring blockage caused by the power grid structure while still meeting design constraints. A power grid planner is used to determine dimensions and locations of power grid components for each IC layer using a power grid formula, an objective for the power grid formula, a set of constraints, and a set of parameters. The method also includes processes of a power grid router, power grid verifier, and global signal router that are used iteratively with processes of the power grid planner to continually refine the dimensions and locations of the power grid components until the power grid structure meets design constraints and until global signal routing is successful on each layer of the IC.

23 Claims, 4 Drawing Sheets

U.S. PATENT DOCUMENTS

| | | | |
|---|---|---|---|
| 6,538,314 | B1 | 3/2003 | Buffet et al. |
| 6,553,554 | B1* | 4/2003 | Dahl et al. .................... 716/11 |
| 6,581,201 | B2 | 6/2003 | Cano et al. |
| 6,598,206 | B2 | 7/2003 | Darden et al. |
| 6,622,294 | B2 | 9/2003 | Saxena et al. |
| 6,657,130 | B2 | 12/2003 | Dyke et al. |
| 6,675,139 | B1 | 1/2004 | Jetton et al. |
| 6,701,509 | B2 | 3/2004 | Aggarwal et al. |
| 6,711,727 | B1 | 3/2004 | Teig et al. |
| 6,795,957 | B2 | 9/2004 | Lai et al. |
| 6,880,143 | B1 | 4/2005 | Yu |
| 6,948,146 | B2 | 9/2005 | Allen et al. |
| 7,003,748 | B1 | 2/2006 | Hsu |
| 7,086,024 | B2 | 8/2006 | Hsu et al. |
| 7,272,803 | B1 | 9/2007 | Hsu |
| 2002/0013931 | A1 | 1/2002 | Cano et al. |
| 2002/0170020 | A1* | 11/2002 | Darden et al. .................. 716/2 |
| 2004/0139417 | A1* | 7/2004 | Allen et al. .................... 716/19 |
| 2005/0023705 | A1 | 2/2005 | Campbell et al. |
| 2007/0294657 | A1 | 12/2007 | Hsu |

OTHER PUBLICATIONS

Chowdhury et al., "Optimum Design of IC Power/Ground Nets subject to Reliability Constraints", Jul. 1988, IEEE Transactions on Computer-Aided Design, vol. 7, No. 7, pp. 787-796.*

Non-Final Office Action of U.S. Appl. No. 10/452,100, mailing date Dec. 15, 2004, Hsu, Hengfu, Non-Final Office Action of commonly owned U.S. Appl. No. 10/452,100.

Final Office Action of U.S. Appl. No. 10/452,100, mailing date Jun. 16, 2005, Hsu, Hengfu, Final Office Action of commonly owned U.S. Appl. No. 10/452,100.

Notice of Allowance of U.S. Appl. No. 10/452,100, mailing date Sep. 6, 2005, Hsu, Hengfu, Notice of Allowance of commonly owned U.S. Appl. No. 10/452,100.

Non-Final Office Action of U.S. Appl. No. 10/452,189, mailing date Jun. 23, 2005, Hsu, Hengfu, Non-Final Office Action of commonly owned U.S. Appl. No. 10/452,189.

Restriction Requirement of U.S. Appl. No. 10/452,189, mailing date Dec. 6, 2005, Hsu, Hengfu, Restriction Requirement of commonly owned U.S. Appl. No. 10/452,189.

Non-Final Office Action of U.S. Appl. No. 10/452,189, mailing date May 5, 2006, Hsu, Hengfu, Non-Final Office Action of commonly owned U.S. Appl. No. 10/452,189.

Restriction Requirement of U.S. Appl. No. 10/452,189, mailing date Sep. 20, 2006, Hsu, Hengfu, Restriction Requirement of commonly owned U.S. Appl. No. 10/452,189.

Final Office Action of U.S. Appl. No. 10/452,189, mailing date Nov. 28, 2006, Hsu, Hengfu, Final Office Action of commonly owned U.S. Appl. No. 10/452,189.

Notice of Allowance of U.S. Appl. No. 10/452,189, mailing date May 11, 2007, Hsu, Hengfu, Notice of Allowance of commonly owned U.S. Appl. No. 10/452,189.

Restriction Requirement/Non-Final Office Action of U.S. Appl. No. 10/452,848, mailing date Nov. 10, 2004, Hsu, Hengfu, et al., Restriction Requirement of commonly owned U.S. Appl. No. 10/452,848.

Final Office Action of U.S. Appl. No. 10/452,848, mailing date May 23, 2005, Hsu, Hengfu, et al., Final Office Action of commonly owned U.S. Appl. No. 10/452,848.

Final Office Action of U.S. Appl. No. 10/452,848, mailing date Dec. 19, 2005, Hsu, Hengfu, et al., Final Office Action of commonly owned U.S. Appl. No. 10/452,848.

Notice of Allowance of U.S. Appl. No. 10/452,848, mailing date Mar. 13, 2006, Hsu, Hengfu, et al., Notice of Allowance of commonly owned U.S. Appl. No. 10/452,848.

International Search Report and Written Opinion for PCT/US2004/015182, published Aug. 21, 2008, Cadence Design Systems, Inc., International Search Report and Written Opinion of commonly owned PCT Patent Application PCT/US2004/015182.

Bobba, et al., A parameter-driven router, 1986, IEEE, pp. 810-818.

Teig, The X Architecture: not your father's diagonal wiring, Apr. 2002, ACM, pp. 33-37.

Wang, Novel Routing Schemes for IC layout, Part I: Two-Layer Channel Routing, 1991, ACM/IEEE, pp. 49-53.

* cited by examiner

US 7,480,887 B1

METHODS AND APPARATUS FOR DEFINING MANHATTAN POWER GRID STRUCTURES BENEFICIAL TO DIAGONAL SIGNAL WIRING

CLAIM OF BENEFIT TO RELATED APPLICATIONS

This application is a continuation of U.S. patent application Ser. No. 10/452,100 filed Jun. 1, 2003, now U.S. Pat. No. 7,003,748 entitled "Methods and Apparatus for Defining Manhattan Power Grid Structures Beneficial to Diagonal Signal Wiring", which is incorporated herein by reference.

FIELD OF THE INVENTION

The invention is directed towards methods and apparatus for defining Manhattan power grid structures of integrated circuits that are beneficial to diagonal signal wiring.

BACKGROUND OF THE INVENTION

An integrated circuit ("IC") is a device (e.g., a semiconductor device) that includes many electronic components, such as transistors, resistors, diodes, etc. These components are often interconnected to form multiple circuit components, such as gates, cells, memory units, arithmetic units, controllers, decoders, etc. An IC includes multiple layers of signal wiring that interconnect its electronic and circuit components. Traditionally, IC's use preferred direction ("PD") wiring models, which specify a preferred wiring direction for each of their wiring layers. In preferred direction wiring models, the preferred direction typically alternates between successive wiring layers.

One example of a PD wiring model is the PD Manhattan wiring model, which specifies alternating layers of preferred-direction horizontal and vertical wiring. Another example of a PD wiring model is the PD diagonal wiring model, which specifies alternating layers of preferred-direction diagonal wiring. The PD diagonal wiring model can allow for shorter wiring distances than the PD Manhattan wiring model and can decrease the total wirelength needed to interconnect the electronic and circuit components of an IC. The PD diagonal wiring model is described in detail in U.S. patent application Ser. No. 10/334,690, filed Dec. 31, 2002, entitled "Method and Apparatus for Routing," incorporated herein by reference and in U.S. patent application Ser. No. 10/013,819, filed Dec. 7, 2001, entitled "Routing Method and Apparatus That Use Diagonal Routes," incorporated herein by reference Design engineers design IC's by transforming logical or circuit descriptions of the IC's into geometric descriptions, called layouts. IC layouts typically include (1) circuit modules (i.e., geometric representations of electronic or circuit IC components) with signal pins, and (2) interconnect lines (i.e., geometric representations of signal wiring) that connect the signal pins of the circuit modules. A signal net is typically defined as a collection of signal pins that need to be connected.

To create layouts, design engineers typically use electronic design automation ("EDA") applications. These applications provide sets of computer-based tools for creating, editing, and analyzing IC design layouts. One EDA tool is a signal wire router that defines routes for interconnect lines that connect the signal pins of signal nets. Signal wire routing is generally divided into two phases: global signal routing and detailed signal routing. For each signal net, global signal routing generates a "loose" route for the interconnect lines that are to connect the signal pins of the signal net. The "looseness" of a global signal route depends on the particular global signal router used. After global signal routes have been created, the detailed signal routing creates specific individual routes for each signal net. A signal wire router that consistently explores diagonal routing directions (referred to herein as a diagonal wire router) is described in the aforementioned patent application titled "Method and Apparatus for Routing."

Each IC also contains a power grid structure that provides power and ground to each electronic and circuit component of an IC. Each electronic or circuit IC component has a power pin and a ground pin that is connected to the power grid structure. A power net is typically defined as a collection of power pins that need to be connected and a ground net is typically defined as a collection of ground pins that need to be connected.

Power grid structure components include stripes, rails, and vias which must be of a certain strength (i.e., size) to meet design constraints (i.e., minimum specifications that the power grid structure must meet in order to be acceptable for use in the IC). Power grid components, however, compete with signal wiring for area on an IC layer since they take up area on the IC layer that signal wiring could otherwise occupy. Also, power grid structure components can cause substantial blockage of signal wiring paths, especially on layers with the PD diagonal wiring model.

FIG. 1 illustrates a top view of a region of an IC layout having a conventional power grid structure 100. The power grid structure 100 includes stripes 105, rails 110, and vias 115. Stripes 105 are typically positioned vertically (i.e., parallel to the layout's y-coordinate axis) across an upper layer of the IC and provide power and ground to the IC. A stripe 105 that carries power is referred to as a power stripe 105 and a stripe 105 that carries ground is referred to as a ground stripe 105.

Rails 110 are typically positioned horizontally (i.e., parallel to the layout's x-coordinate axis) across at least one lower layer of the IC. Each rail 110 is connected to a stripe 105 through vias 115. A rail 110 connected to a power stripe 105 is referred to as a power rail 110 and a rail 110 connected to a ground stripe 105 is referred to as a ground rail 110.

Vias 115 are positioned perpendicular to the IC's layers (i.e., parallel to the layout's z-coordinate axis) and distribute power or ground from the stripes 105 to the rails 110. Multiple vias 115 are arranged in a via array which is used to connect a stripe 105 to a rail 110. For illustrative purposes, FIG. 1 shows a top view of a via array as enclosed by a rectangular bounding box, the via array being comprised of multiple vias 115. A via array has an area that is typically determined by an intersection area of a stripe 105 and rail 110 (i.e., locations where stripes 105 and rails 110 cross in terms of the layout's x and y-coordinate axes). The area of a via array is typically the same on each layer.

A via 115 (or via array) that connects a power stripe 105 to a power rail 110 is referred to as a power via 115 (or power via array) and a via 115 that connects a ground stripe 105 to a ground rail 110 is referred to as a ground via 115 (or ground via array). A power via 115 is typically located at every intersection of a power stripe 105 and power rail 110 and a ground via 115 is typically located at every intersection of a ground stripe 105 and ground rail 110.

Since the vias 115 of the power grid structure are positioned upright through the IC, they can cause blocking of the signal wiring needed to interconnect the electronic and circuit components of the IC. The amount of wiring blockage varies from layer to layer depending on the PD wiring model of the layer. As shown in FIG. 1, diagonal direction arrows 130 illustrate how diagonal wiring paths are blocked by vias 115 of the conventional power grid structure 100.

Conventionally, design engineers manually define the power grid structure by methods of trial and error. For example, designer engineers typically estimate stripe width and stripe spacing values (the distance from one stripe to the next) based on prior experience. The stripe width effects the area of a via array since the area of a via array is typically determined by an intersection area of a stripe and rail. The estimated stripe width (and resulting via array area) is typically larger than needed to meet design constraints for the power grid structure so that the stripes and vias of the power grid structure take up more area than necessary on an IC layer. Also, the estimated stripe spacing values effect the locations of the via arrays since a via array is placed at stripe and rail intersections. The estimated stripe spacing values typically place the via arrays in a position that causes a substantial amount of diagonal wiring blockage on layers with the PD diagonal wiring model.

Therefore, conventional power grid structures typically occupy more area on IC layers than necessary and cause substantial diagonal wiring blockage on layers with the PD diagonal wiring model. This is due to the fact that, conventionally, power grid components are not defined in a systematic way to minimize the area of the power grid structure or to minimize diagonal wiring blockage. Therefore, there is a need for an automated method and apparatus for defining a power grid structure that minimizes the area of the power grid structure and minimizes the diagonal wiring blockage caused by the power grid structure while still meeting the design constraints for the power grid structure.

SUMMARY OF THE INVENTION

Some embodiments of the invention provide a method for defining and producing a power grid structure of an IC that minimizes the area of the power grid structure area and the diagonal wiring blockage caused by the power grid structure while still meeting design constraints. The method includes processes of a power grid planner, power grid router, power grid verifier, and global signal router that are used iteratively to define and produce the power grid structure. Power grid structure components include stripes, rails, and vias.

The processes of the power grid planner includes receiving a set of parameters (e.g., a distance from one IC layer to an adjacent IC layer), an initial set of constraints including design constraints (i.e., minimum specifications that the power grid structure must meet in order to be acceptable for use in the IC), layer constraints (e.g., a minimum and maximum area that the power grid structure can occupy on a given layer) and/or other miscellaneous constraints (e.g., a constraint that spacing width between stripes be an integer multiple of the spacing width between rails of the power grid structure).

The power grid planner also receives a power grid formula and an objective for the power grid formula (e.g., a minimum width for stripes). The power grid planner determines dimensions and locations of power grid components for each IC layer using the power grid formula, the objective, the initial set of constraints, and the set of parameters. In some embodiments, the power grid planner uses a solver program for this step.

The power grid router physically lays down the power grid components according to the determined dimensions and locations. The power grid verifier tests the resulting power grid structure to determine if the power grid structure meets the initial design constraints. If the power grid structure does not meet the initial design constraints, the power grid planner modifies one or more of the design, layer, and/or miscellaneous constraints to produce a modified set of constraints. The power grid planner then determines refined dimensions and locations of the power grid components using the modified set of constraints, the power grid formula, the objective, and the set of parameters. The processes of the power grid planner, the power grid router, and the power grid verifier repeats in an iterative loop to continually refine the dimensions and locations of the power grid components until the power grid structure meets the initial design constraints.

If the power grid verifier determines that the power grid structure meets the initial design constraints, the global signal router performs global signal routing operations and determines whether the global signal routing was successful. If wiring demand exceeds wiring capacity on any layer of the IC, the global signal routing has not been successful and the power grid planner modifies one or more layer constraints (e.g., by increasing and/or decreasing a minimum and/or maximum area that the power grid structure can occupy on a given layer) to produce a modified set of constraints.

The power grid planner then determines refined dimensions and locations of the power grid components using the modified set of constraints, the power grid formula, the objective, and the set of parameters. The processes of the power grid planner, the power grid router, the power grid verifier, and the global signal router repeats in an iterative loop to continually refine the dimensions and locations of the power grid components until the global signal routing is successful.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
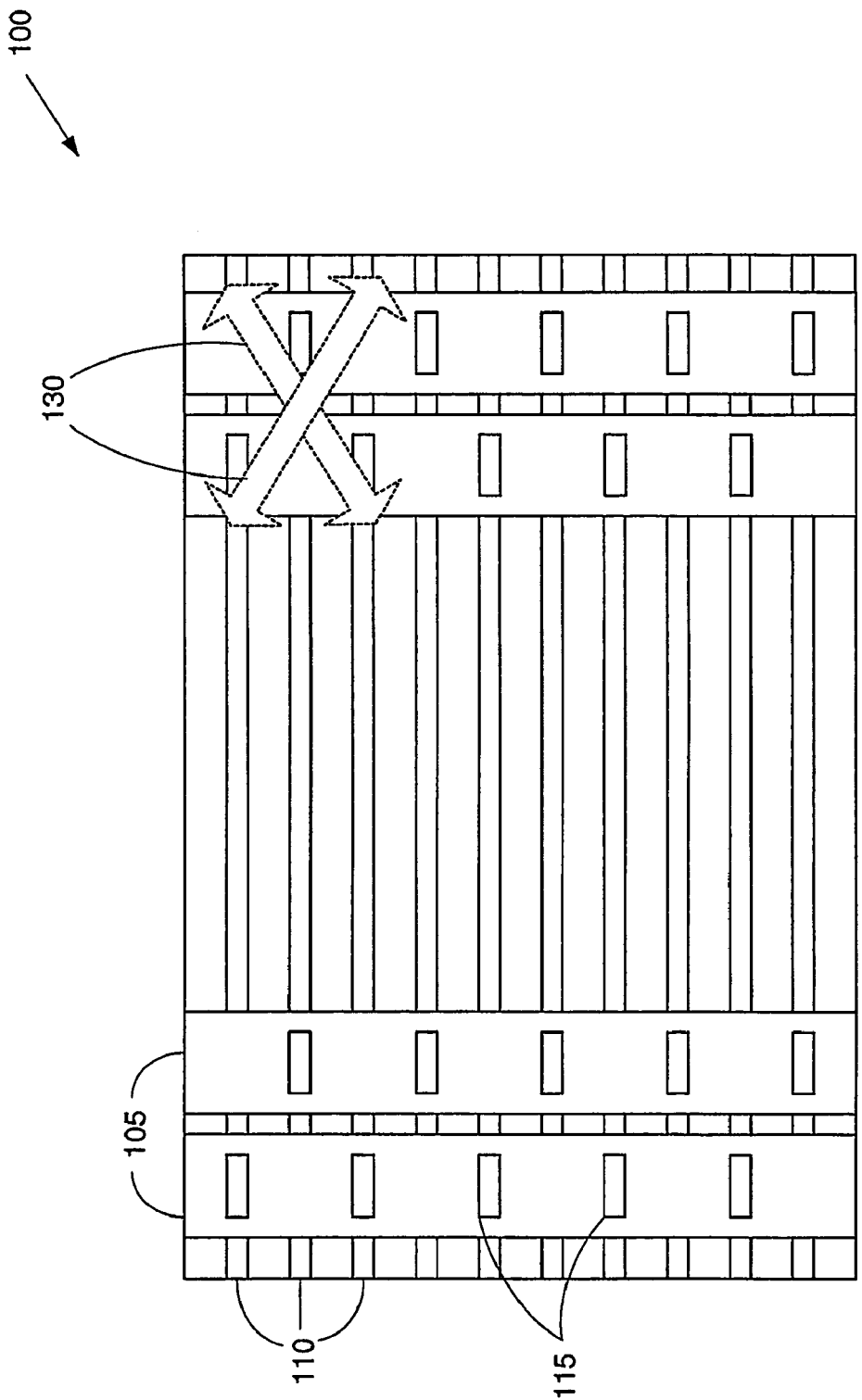
FIG. 1 illustrates a top view of a region of an IC layout having a conventional power grid structure.

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments of the invention provide a method for defining and producing a power grid structure of an IC that minimizes the area of the power grid structure area and the diagonal wiring blockage caused by the power grid structure while still meeting design constraints. The method includes processes of a power grid planner, power grid router, power grid verifier, and global signal router that are used iteratively to define and produce the power grid structure. Power grid structure components include stripes, rails, and vias.

The processes of the power grid planner includes receiving a set of parameters (e.g., a distance from one IC layer to an adjacent IC layer), an initial set of constraints including design constraints (i.e., minimum specifications that the power grid structure must meet in order to be acceptable for use in the IC), layer constraints (e.g., a minimum and maximum area that the power grid structure can occupy on a given layer) and/or other miscellaneous constraints (e.g., a constraint that spacing width between stripes be an integer multiple of the spacing width between rails of the power grid structure). The power grid planner also receives a power grid formula and an objective for the power grid formula (e.g., a minimum width for stripes). The power grid planner determines dimensions and locations of power grid components using the power grid formula, objective, and the initial set of constraints. In some embodiments, the power grid planner uses a solver program for this step.

The power grid router physically lays down the power grid components according to the determined dimensions and locations. The power grid verifier tests the resulting power grid structure to determine if the power grid structure meets the initial design constraints. If the power grid structure does not meet the initial design constraints, the power grid planner modifies one or more of the design, layer, and/or miscellaneous constraints to produce a modified set of constraints. The power grid planner then determines refined dimensions and locations of the power grid components using the modified set of constraints, the power grid formula, and the objective. The processes of the power grid planner, the power grid router, and the power grid verifier repeats in an iterative loop to continually refine the dimensions and locations of the power grid components until the power grid structure meets the initial design constraints.

If the power grid verifier determines that the power grid structure meets the initial design constraints, the global signal router performs global signal routing operations and determines whether the global signal routing was successful. If wiring demand exceeds wiring capacity on any layer of the IC, the global signal routing has not been successful and the power grid planner modifies one or more layer constraints (e.g., by increasing and/or decreasing a minimum and/or maximum area that the power grid structure can occupy on a given layer) to produce a modified set of constraints.

The power grid planner then determines refined dimensions and locations of the power grid components using the modified set of constraints, the power grid formula, and the objective. The processes of the power grid planner, the power grid router, the power grid verifier, and the global signal router repeats in an iterative loop to continually refine the dimensions and locations of the power grid components until the global signal routing is successful.

In the embodiments described below, the power grid structure is described in relation to a six-layer wiring model that has horizontal wiring on wiring layer 1, vertical wiring on wiring layer 2, horizontal wiring on wiring layer 3, 45° diagonal wiring on wiring layer 4, 135° diagonal wiring on wiring layer 5, and vertical wiring on wiring layer 6. One of ordinary skill in the art will realize that the power grid structure can be used in other wiring models in other embodiments. In some embodiments, an interconnect line is "diagonal" if it forms an angle other than 0° or 90° with respect to the layout's Cartesian coordinate axes, which are typically parallel with the layout's boundary and/or the boundary of the layout's expected IC. A component or interconnect line is "horizontal" or "vertical" if it forms an angle of 0° or 90° with respect to one of the coordinate axes of the layout.

In some embodiments described below, stripes of a power grid structure are positioned vertically (i.e., parallel to the layout's y-coordinate axis) across a top layer of the IC and rails of a power grid structure are positioned horizontally (i.e., parallel to the layout's x-coordinate axis) across a lower layer of the IC. One of ordinary skill in the art will realize that the stripes may be positioned horizontally and/or be laid on a different layer or on multiple layers of the IC in other embodiments. One of ordinary skill in the art will also realize that the rails may be positioned vertically and/or may be laid on a different layer or on multiple layers of the IC in other embodiments. Power grid structures having stripes positioned vertically or horizontally and rails positioned vertically or horizontally are referred to as Manhattan power grid structures.

As used herein, the term "intersection" refers to a location where a stripe and rail cross in terms of an IC layout's x and y-coordinate axes, and does not refer to an actual physical intersection of the stripe and rail. As used herein, the term "modified set of constraints" refers to a set of constraints where one or more constraints have been modified during an iterative loop in the processes of the present invention. As such, a modified set of constraints may also have one or more constraints that have not been modified during the iterative loop.

Figure 2:
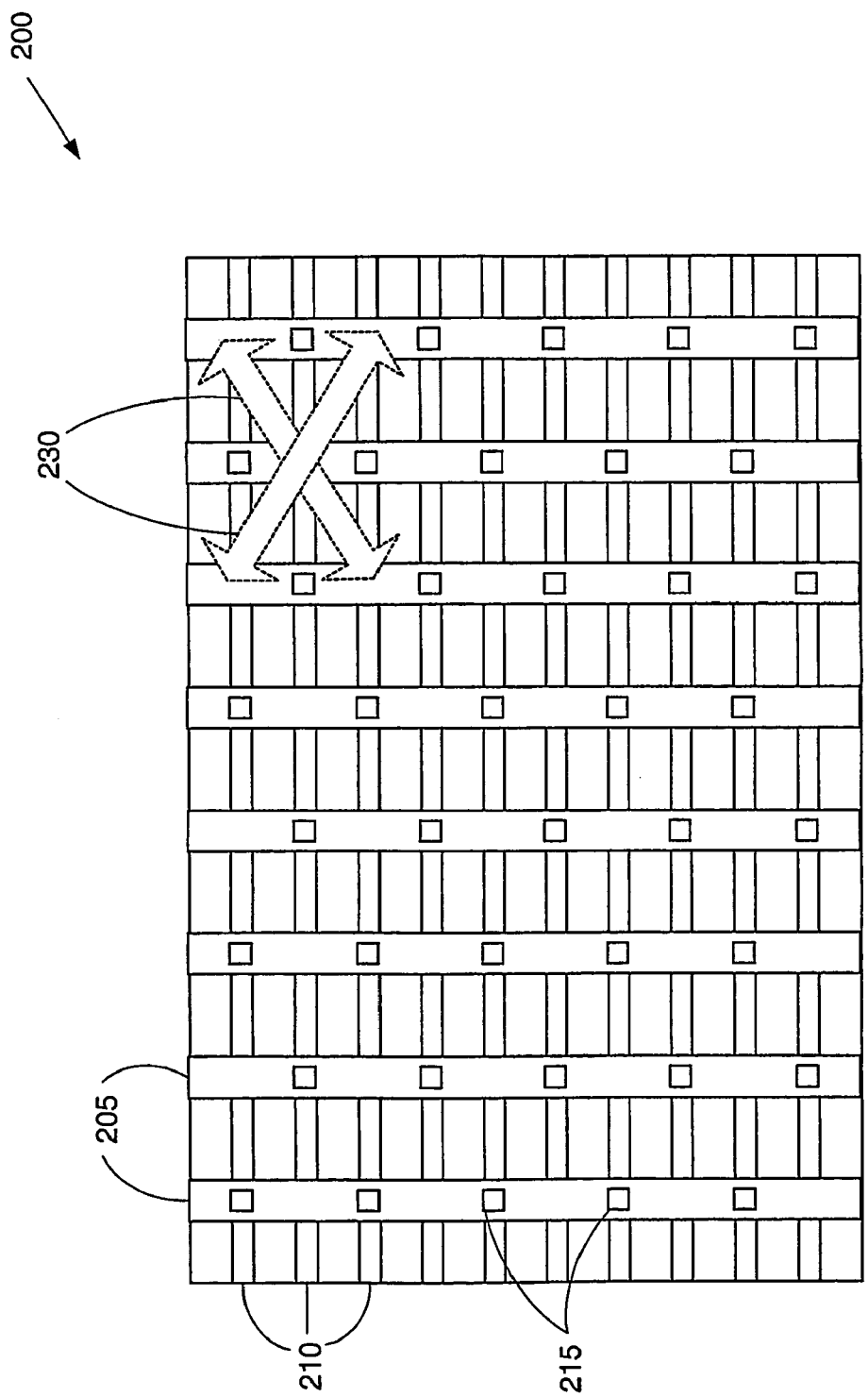
FIG. 2 illustrates a top view of a region of an IC layout having a power grid structure defined by methods of the present invention.

FIG. 2 illustrates a top view of a region of an IC layout having a power grid structure 200 defined by methods of the present invention. The power grid structure 200 includes stripes 205, rails 210, and vias 215.

Stripes 205 are positioned parallel to one another and vertically (i.e., parallel to the layout's y-coordinate axis) across a top layer of the IC and provide power to the IC. A stripe 205 that carries power is referred to as a power stripe 205 and a stripe 205 that carries ground is referred to as a ground stripe 205. A stripe 205 is defined by its width (in terms of x-coordinates of the layout) and its location on the layer. In some embodiments, methods of the present invention determine a minimum stripe width for stripes in the power grid structure while still meeting design constraints for the power grid structure. The locations of the stripes 205 are defined by a distance (in terms of x-coordinates) from an edge of the layout of a first stripe 205 and a distance defined by a stripe spacing width (in terms of x-coordinates) between stripes 205 thereafter.

Rails 210 are positioned parallel to one another and horizontally (i.e., parallel to the layout's x-coordinate axis) across at least one lower layer of the IC. Rails 210 are placed in a perpendicular position relative to the stripes 205. Each rail 210 is connected to a stripe 205 through vias 215. A rail 210 connected to a power stripe 205 is referred to as a power rail 210 and a rail 210 connected to a ground stripe 205 is referred to as a ground rail 210. A power rail 210 and a ground rail 210 are connected to each electronic and circuit component (not shown) of the IC through the power pin and ground pin, respectively, of the electronic or circuit component.

A rail 210 is defined by its width (in terms of y-coordinates) and its location on the layer. The locations of the rails 210 are defined by a distance (in terms of y-coordinates) from an edge of the layout of a first rail 210 and a distance defined by a rail spacing width (in terms of y-coordinates) between rails 210 thereafter. In some embodiments, the stripe spacing width is an integer multiple of the rail spacing width. By having the stripe spacing width as an integer multiple of the rail spacing width, vias 215 (which are located at the intersections of the stripes 205 and rails 210) are placed in positions that do not cause substantial diagonal wiring blockage. In other words, having the stripe spacing width as an integer multiple of the rail spacing width increases the amount of diagonal signal wiring that can be routed between the vias 215 of the power grid structure.

Vias 215 are positioned perpendicular to the IC's layers (i.e., parallel to the layout's z-coordinate axis) and distribute power or ground from the stripes 205 to the rails 210. Multiple vias 215 are arranged in a via array which is used to connect a stripe 205 to a rail 210. For illustrative purposes, FIG. 2 shows a top view of a via array as enclosed by a bounding box, the via array being comprised of multiple vias 215. A via array has an area as defined by its width and length (in terms of x-coordinates and y-coordinates of the layout, respectively). In some embodiments, the area of a via array is not equal on each layer and a different number of vias is used in the via array and/or a different via arrangement is used at different layers.

A via 215 (or a via array comprised of multiple vias) spans from one layer to a next adjacent layer of the IC. To span several layers, several vias 215 (or several via arrays) are stacked from one layer to another. Stacked vias 215 (or stacked via arrays) are used to span more than one layer to connect stripes 205 (typically located on the top layer) to rails 210 (typically located on a lower layer). A via 215 (or via array) that connects (either directly or through another via 215) a power stripe 205 and a power rail 210 is referred to as a power via 215 (or power via array). A via 215 that connects (either directly or through another via 215) a ground stripe 205 and a ground rail 210 is referred to as a ground via 215 (or ground via array). A power via 215 (or power via array) is located at every intersection of a power stripe 205 and power rail 210 and a ground via 215 (or ground via array) is located at every intersection of a ground stripe 205 and ground rail 210.

Areas between the vias 215 on the layout define wiring tracks (i.e., wiring capacity) where signal wiring required for the IC layout (i.e., wiring demand) can be routed. Wiring tracks that allow horizontal wiring on the layout are referred to as horizontal wiring tracks. Layouts having relatively large amounts of horizontal wiring tracks are beneficial to layers having horizontal preferred wiring, for example, layers 1 and 3 of the six-layer wiring model. A horizontal blockage percentage is the percentage of a layer's total area where horizontal wiring is being blocked or occupied by power grid components. Wiring tracks that allow vertical wiring on the layout are referred to as vertical wiring tracks. Layouts having relatively large amounts of vertical wiring tracks are beneficial to layers having vertical preferred wiring, for example, layer 2 of the six-layer wiring model. A vertical blockage percentage is the percentage of a layer's total area where vertical wiring is being blocked or occupied by power grid components.

Wiring tracks that allow diagonal wiring on the layout are referred to as diagonal wiring tracks. Layouts having relatively large amounts of diagonal wiring tracks are beneficial to layers having diagonal preferred wiring, for example, layers 4 and 5 of the six-layer wiring model. A diagonal blockage percentage is the percentage of a layer's total area where diagonal wiring is being blocked or occupied by power grid components. Note that the power grid structure 200 produced by methods of the present invention will have reduced diagonal wiring blockage and a reduced diagonal blockage percentage relative to the conventional power grid structure 100 of FIG. 1. Diagonal direction arrows 230 illustrate how diagonal signal wiring can be routed between vias 215 (or via arrays) of the power grid structure 200. As stated above, having the stripe spacing width as an integer multiple of the rail spacing width increases the amount of diagonal signal wiring that can be routed between the vias 215 of the power grid structure.

Blockage percentages of the layer of an IC are said to be evenly distributed if the horizontal, vertical, and diagonal blockage percentages of the layers are balanced. The conventional power grid structure 100, however, will typically not have balanced blockage percentages since the diagonal blockage percentage is typically much higher than the horizontal and vertical blockage percentages. Applying the six-layer wiring model to the conventional power grid structure 100, there would be much less wire routing possible on layers 4 and 5 of the conventional power grid structure 200 than on layers 1, 2, and 3 since the diagonal blockage percentage is significantly higher than the horizontal and vertical blockage percentages.

The power grid structure 200 produced by methods of the present invention will have reduced diagonal blockage percentage relative to the conventional power grid structure 100 and, thereby, have more balanced blockage percentages as well. Applying the six-layer wiring model to the power grid structure 200, there would be more evenly distributed wire routing through layers 1 through 5 of the power grid structure 200 since the horizontal, vertical, and diagonal blockage percentages are more evenly balanced.

Figure 3:
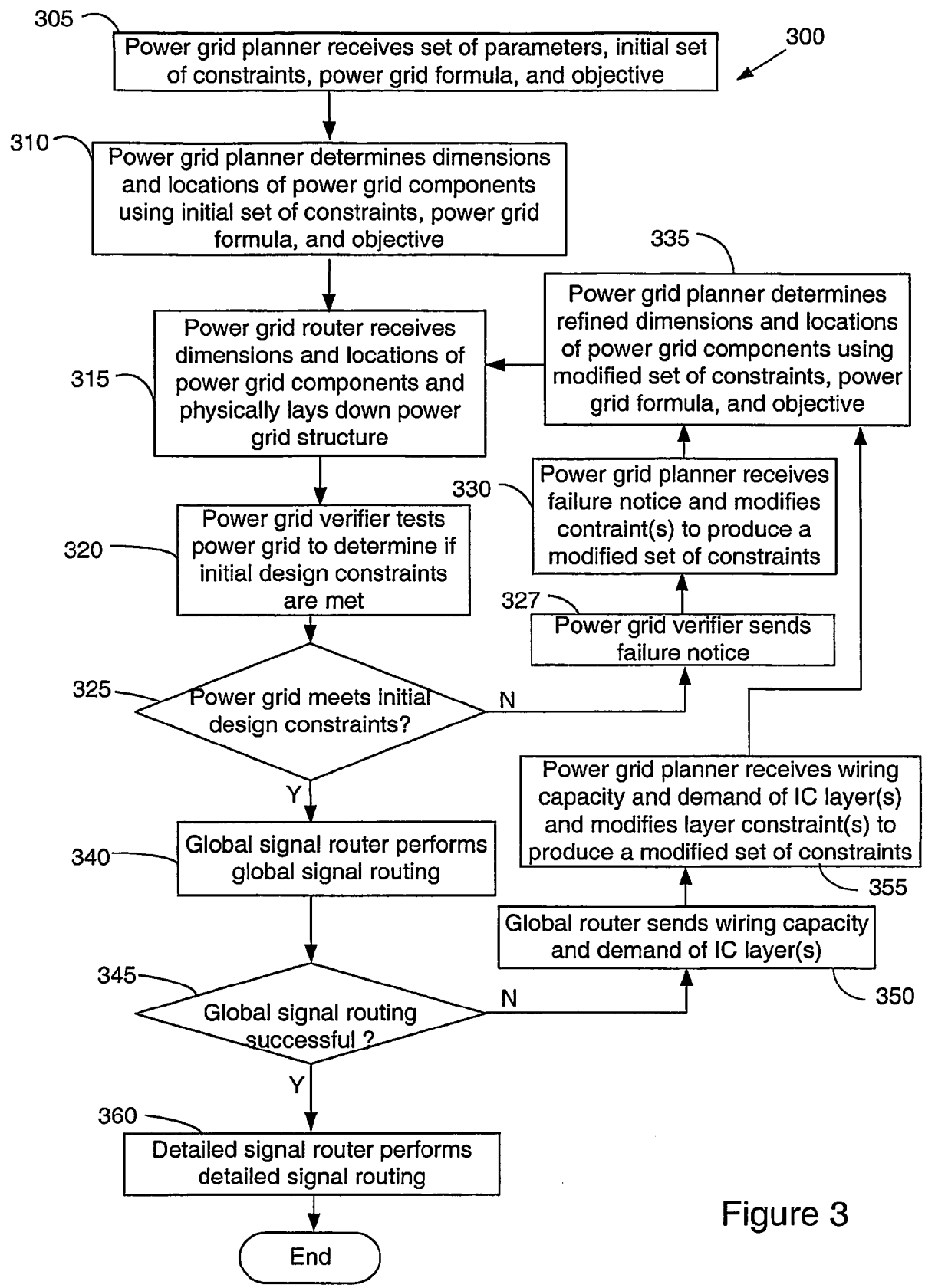
FIG. 3 shows a general process for defining and producing a power grid structure in accordance with the present invention.

FIG. 3 shows a general process 300 for defining and producing a power grid structure of an IC in accordance with the present invention. The general process 300 minimizes the area of the power grid structure area and the diagonal wiring blockage caused by the power grid structure while still meeting design constraints. The general process 300 includes processes of a power grid planner, power grid router, power grid verifier, and global signal router that are used iteratively to define and produce a power grid structure (such as the power grid structure 200 shown in FIG. 2).

The general process 300 begins when the power grid planner receives (at 305) a set of parameters, an initial set of constraints, a power grid formula, and an objective for the power grid formula. The set of parameters includes fixed values relating to the IC or the power grid structure, such as a number of IC layers, a distance from one IC layer to an adjacent IC layer, an utilizable area on each IC layer, etc. The initial set of constraints can include initial design constraints (i.e., design specifications), layer constraints, and/or other miscellaneous constraints. Initial design constraints are minimum specifications that the power grid structure must meet in order to be acceptable for use in the IC. Layer constraints include a minimum and maximum area that components of the power grid structure can occupy on a given layer. In some embodiments, the miscellaneous constraints include a constraint that stripe spacing width between stripes of the power grid structure be an integer multiple of the rail spacing width between rails of the power grid structure.

The power grid planner then determines (at 310) dimensions and locations of power grid components for each IC layer using the initial set of constraints, the power grid formula, the objective, and the set of parameters. In some embodiments, the power grid planner determines a stripe width and stripe spacing width for stripes of the power grid structure. In other embodiments, the power grid planner determines a number of vias in each via array and/or a width and length of via arrays of the power grid structure. In further embodiments, the power grid planner determines a different number of vias in each via array and/or a different width and length of via arrays for different layers of the IC. In some embodiments, the power grid formula contains one or more dimensions and/or locations of power grid components that are fixed (i.e., non-variable) and which are passed on to the power grid router.

The power grid router receives (at 315) dimensions and locations of the power grid components (for example, as a set of commands) and physically lays down the power grid components for each layer of the IC according to the received dimensions and locations. The power grid verifier then tests (at 320) the resulting power grid structure to determine if the power grid structure meets the initial design constraints. The power grid verifier may be comprised of, for example, a Spice-based simulator. If the power grid verifier determines (at 325—No) that the power grid structure does not meet the initial design constraints, the power grid verifier sends (at 327) a failure notice to the power grid planner.

The power grid planner then receives (at 330) the failure notice and modifies one or more of the design, layer, and/or miscellaneous constraints to produce modified design, layer, and/or miscellaneous constraints and a modified set of constraints. For example, the power grid planner may produce tighter design constraints to define a stronger power grid structure having components that takes up greater space on the IC layers. Note that even if tighter design constraints (i.e., modified design constraints) are produced by the power grid planner, it is only the initial design constraints that must be met for the power grid structure to be acceptable for use in the IC. The tighter design constraints are used by the power grid planner only to define a stronger power grid structure that is more likely to meet the minimum specifications (i.e., initial design constraints) that the power grid structure must meet in order to be acceptable for use in the IC.

The power grid planner then determines (at 335) refined dimensions and locations of the power grid components using the power grid formula, the objective, the modified set of constraints, and the set of parameters. The general process 300 then repeats steps 315 through 325. As such, the dimensions and locations of the power grid components are refined through an iterative process between the power grid planner, the power grid router, and the power grid verifier (where an iterative loop is formed by steps 315 through 335) until the power grid structure meets the initial design constraints.

If the power grid verifier determines (at 325—Yes) that the power grid structure does meet the initial design constraints, the global signal router performs (at 340) global signal routing operations for each signal net of the IC. For each signal net, the global signal router generates a "loose" route for interconnect lines that are to connect the signal pins of the signal net. The routes for the interconnect lines define routes for signal wiring that interconnect electronic and circuit components of the IC.

The global signal router then tests (at 345) to determine whether the global signal routing was successful. This can be determined, for example, by determining and comparing a wiring capacity and wiring demand for each layer of the IC. Wiring capacity is the amount of wiring tracks available on a layer whereas wiring demand is the amount of wiring that the global signal router is attempting to route through a layer. If the wiring demand exceeds the wiring capacity on a layer of the IC, the global signal routing is not successful on that layer. Also, if the wiring demand exceeds the wiring capacity on any layer of the IC, the global signal router determines (at 345—No) that the global signal routing for the IC is not successful. The global signal router then sends (at 350) to the power grid planner values representing the wiring capacity and wiring demand of a layer where the wiring demand exceeded the wiring capacity. In some embodiments, the global signal router also sends values representing the wiring capacity and wiring demand of other IC layers.

The power grid planner receives (at 355) the values representing the wiring capacity and wiring demand of a layer where the wiring demand exceeded the wiring capacity and modifies the layer constraints of the layer to produce modified layer constraints and a modified set of constraints. In some embodiments, the power grid planner also receives (at 355) values representing the wiring capacity and wiring demand of other layers and modifies the layer constraints of the other layers to produce modified layer constraints and a modified set of constraints.

The power grid planner then determines (at 335) refined dimensions and locations of the power grid components using the power grid formula, the objective, the modified set of constraints, and the set of parameters. The general process 300 then repeats steps 315 through 345. Therefore, the dimensions and locations of the power grid components are further refined through an iterative process between the power grid planner, the power grid router, the power grid verifier, and the global signal router (where an iterative loop is formed by steps 315 through 355) until the global signal routing is successful.

If the wiring demand does not exceed the wiring capacity on any layer of the IC, the global signal router determines (at 345—Yes) that the global signal routing is successful. A detailed signal router then performs (at 360) detailed signal routing to create specific individual routes for each signal net. Then the general process 300 ends.

Figure 4:
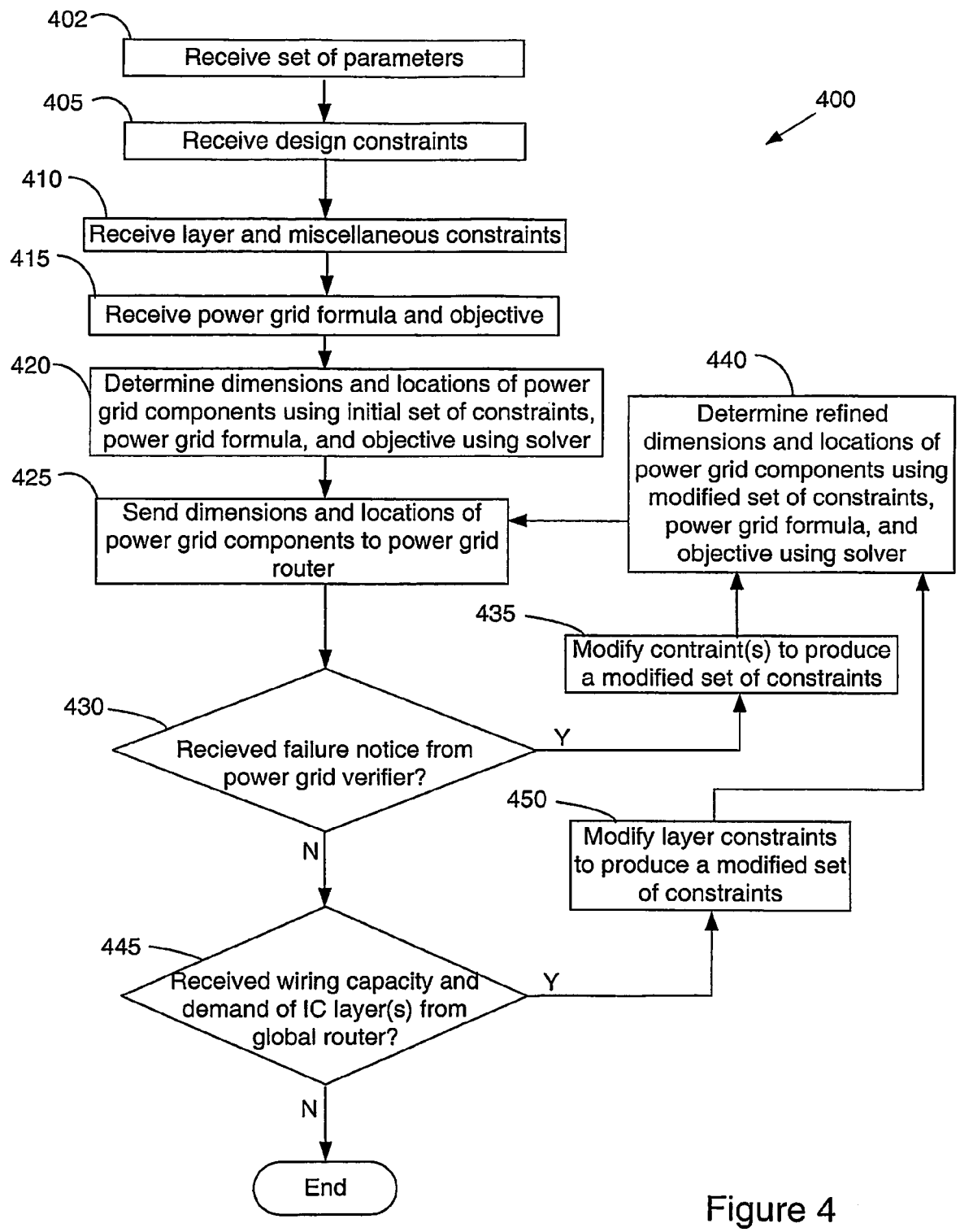
FIG. 4 shows a process of a power grid planner for defining a power grid structure in accordance with the present invention.

FIG. 4 shows a process 400 of a power grid planner for defining a power grid structure of an IC in accordance with the present invention. The process 400 begins when the power grid planner receives (at 402) a set of parameters. The set of parameters includes fixed values relating to the IC or the power grid structure, such as a number of IC layers, a distance from one IC layer to an adjacent IC layer, an utilizable area on each IC layer, etc.

The power grid planner then receives (at 405) initial design constraints (i.e., design specifications) for the power grid structure. Initial design constraints are minimum specifications that the power grid structure must meet in order to be acceptable for use in the IC. Different design constraints may be specified for a power net (a collection of power pins that need to be connected in the IC) and a ground net (a collection of ground pins that need to be connected in the IC). Design constraints may include, for example, a threshold voltage drop across the power grid structure, a threshold voltage required at each power pin of an electronic or circuit component of the IC, and/or a switching frequency threshold of the IC. Design constraints may also include, for example, a threshold electro-migration value which reflects metal breakdown due to Joule heat, operational temperature, or its operational year total and/or a threshold switching noise value which reflects voltage reduction on a power supply due to a current change during logic switching.

The power grid planner then receives (at 410) layer constraints and other miscellaneous constraints. Layer constraints include a minimum and maximum area that components of the power grid structure can occupy on a given layer. Layer constraints allow the power grid planner to control the distribution of the power grid structure area among different IC layers. Increasing the minimum and/or maximum power grid structure areas of a layer decreases wiring capacity on the layer since less area on the layer would then be available for signal routing. Decreasing the minimum and/or maximum power grid structure areas of a layer increases the wiring capacity on the layer since more area on the layer would then be available for signal routing. The minimum and maximum power grid structure areas may be expressed, for example, as a percentage of a layer's total area that components of the power grid structure components can occupy. For example, layer constraints may specify that layer 1 can have a minimum power grid area of 15% and a maximum power grid area of 35%.

In some embodiments, the miscellaneous constraints include a constraint that stripe spacing width between stripes of the power grid structure be an integer multiple of the rail spacing width between rails of the power grid structure. The integer multiple constraint is used to produce a power grid structure with significantly reduced diagonal wiring blockage. By having the stripe spacing width as an integer multiple of the rail spacing width, a greater amount of diagonal wiring tracks is possible between vias (or via arrays) that are located at the intersections of the stripes and rails. The received design, layer, and miscellaneous constraints comprise an initial set of constraints.

The power grid planner then receives (at 415) a power grid formula and an objective for the power grid formula. In some embodiments, the objective of the power grid formula is a minimum width for stripes of the power grid structure. In other embodiments, the objective of the power grid formula is a minimum number of vias to be used in the power grid structure. In further embodiments, the objective of the power grid formula is a minimum width and length for via arrays of the power grid structure. An objective requiring a minimum size of a power grid component is used to minimize the area of the power grid structure of an IC while still meeting the initial design constraints for the power grid structure.

The power grid planner then determines (at 420) dimensions and locations of power grid components for each IC layer using the power grid formula, the objective, the initial set of constraints, and the set of parameters. The power grid formula receives as inputs the set of parameters and the set of constraints and outputs a value meeting the objective of the power grid formula and values for dimensions and locations of power grid components for each IC layer. In some embodiments, the power grid planner determines the objective and dimensions and locations of power grid components using an optimizer (i.e., solver) program. The optimizer program is a nonlinear programming application that implements computer algorithms to determine a value for the objective and values for dimensions and locations of the power grid components. Nonlinear programming applications are well-known in the art and are not described in detail here. A further description of nonlinear programming applications can be found, for example, in the book *Nonlinear Programming*, by D. P. Bertsekas (second edition Athena Scientific, 1999).

In some embodiments, the power grid planner determines a minimum stripe width for the stripes of the power grid structure while still meeting the initial design constraints. In other embodiments, the power grid planner determines the minimum width and length values for via arrays of the power grid structure while still meeting the initial design constraints. The width and length values of via arrays may be equal from layer to layer or vary from layer to layer (since a different number of vias may be used in the via array and/or a different via arrangement may be used at different layers). In further embodiments, the spacing width between stripes is an integer multiple of the spacing width between rails of the power grid structure. In yet further embodiments, the power grid formula contains one or more dimensions and/or locations of power grid components that are fixed (i.e., non-variable) and which are passed on to the power grid router.

The power grid planner then sends (at 425) dimensions and locations of power grid components for each IC layer to the power grid router, for example, as a set of commands. As described above in relation to FIG. 3, the power grid router receives then the dimensions and locations of the power grid components and physically lays down the power grid structure components for each IC layer. The power grid verifier then tests the resulting power grid structure and sends a failure notice to the power grid planner if the power grid structure does not meet the initial design constraints.

Therefore, after step 425, the power grid planner checks (at 430) to determine if a failure notice from the power grid verifier has been received. If so, the power grid planner modifies (at 435) one or more of the design, layer, and/or miscellaneous constraints to produce modified design, layer, and/or miscellaneous constraints and a modified set of constraints. For example, the power grid planner may produce tighter design constraints to define a stronger power grid structure having components that takes up greater space on the IC layers. For example, the power grid planner may decrease the voltage drop threshold (e.g., from 5 mV to 4 mV) or increase the switching frequency threshold of the IC (e.g., from 500 Mhz to 600 Mhz) to produce a stronger power grid structure. Note that even if tighter design constraints (i.e., modified design constraints) are produced by the power grid planner, it is only the initial design constraints (received at 405) that must be met for the power grid structure to be acceptable for use in the IC. The power grid planner then determines (at 440) refined dimensions and locations of the power grid components using the modified set of constraints, the power grid formula, the objective, and the set of parameters.

As described above in relation to FIG. 3, if the power grid verifier determines that the power grid structure meets the initial design constraints, the global signal router then performs global signal routing operations and tests whether the global signal routing was successful. If the global signal routing was not successful, the global signal router sends to the power grid planner values representing the wiring capacity and wiring demand of one or more IC layers. Therefore, after step 430, the power grid planner checks (at 445) to determine if values representing the wiring capacity and wiring demand of one or more IC layers has been received from the global signal router.

If so, the power grid planner modifies (at 450) one or more layer constraints to produce modified layer constraints and a modified set of constraints. For example, for a layer where the wiring demand exceeded the wiring capacity, the power grid planner may modify the layer constraints for the layer by decreasing the minimum and/or maximum power grid structure areas allowed on the layer. This would increase the wiring capacity on the layer since more area on the layer would then be available for signal wiring. The area of the power grid structure can be decreased on a layer, for example, by reducing the area of the via arrays on the layer. Note that decreasing the minimum and/or maximum power grid structure areas on a layer may require increasing the minimum and/or maximum power grid structure areas on another layer for the power grid structure to meet the initial design constraints. Also, reducing the area of the via arrays on a layer may require increasing the area of the via arrays on another layer for the power grid structure to meet the initial design constraints.

As a further example, for a layer where wiring demand does not exceed the wiring capacity, the power grid planner may modify the layer constraints for the layer by increasing the minimum and/or maximum power grid structure areas allowed on the layer. The area of the power grid structure can be increased on a layer, for example, by increasing the area of the via arrays on the layer. This would decrease the wiring capacity on the layer since less area on the layer would then be available for signal wiring. A decrease in wiring capacity would be acceptable for this layer as long as wiring demand does not then exceed the wiring capacity. Increasing the minimum and/or maximum power grid structure areas on a layer also allows decreasing the minimum and/or maximum power grid structure areas on another layer. In some embodiments, the power grid planner determines the amount of decrease or increase in the minimum or maximum power grid structure area of a layer based on the amount of the difference in the wiring capacity and wiring demand of the layer.

After producing (at 450) the modified set of constraints, the power grid planner then determines (at 440) refined dimensions and locations of the power grid components using the modified set of constraints, the power grid formula, the objective, and the set of parameters.

If the power grid planner did not receive (at 445—No) values representing the wiring capacity and wiring demand of one or more IC layers from the global signal router, the process 400 ends.

In the embodiments described above, the power grid structure is described in relation to a six-layer wiring model that has horizontal wiring on wiring layer 1, vertical wiring on wiring layer 2, horizontal wiring on wiring layer 3, 45° diagonal wiring on wiring layer 4, and 135° diagonal wiring on wiring layer 5. One of ordinary skill in the art will realize that the power grid structure can be used in other wiring models in other embodiments. In some embodiments, an interconnect line is "diagonal" if it forms an angle other than 0° or 90° with respect to the layout's Cartesian coordinate axes, which are typically parallel with the layout's boundary and/or the boundary of the layout's expected IC. A component or interconnect line is "horizontal" or "vertical" if it forms an angle of 0° or 90° with respect to one of the coordinate axes of the layout.

In some embodiments described above, stripes of a power grid structure are positioned vertically (i.e., parallel to the layout's y-coordinate axis) across a top layer of the IC and rails of a power grid structure are positioned horizontally (i.e., parallel to the layout's x-coordinate axis) across a lower layer of the IC. One of ordinary skill in the art will realize that the stripes may be positioned horizontally and/or be laid on a different layer or on multiple layers of the IC in other embodiments. One of ordinary skill in the art will also realize that the rails may be positioned vertically and/or may be laid on a different layer or on multiple layers of the IC in other embodiments.

As used in the description above, the term "intersection" refers to a location where a stripe and rail cross in terms of an IC layout's x and y-coordinate axes, and does not refer to an actual physical intersection of the stripe and rail. Also, the term "modified set of constraints" refers to a set of constraints where one or more constraints have been modified during an iterative loop in the processes of the present invention. As such, a modified set of constraints may also have one or more constraints that have not been modified during the iterative loop.

Several embodiments have been described above in relation to power grid structures having minimized areas and being defined by a power grid formula and a set of constraints as used in an iterative process involving a power grid planner, a power grid router, a power grid verifier, and a global signal router. These embodiments may be combined with methods for reducing the number of vias in a power grid structure (while still meeting design specifications) and methods for locating vias in the power grid structure in such a way as to be especially beneficial to 45° or 135° diagonal wiring paths. Such methods are described in U.S. patent application Ser. No. 10/452,189, entitled "Methods and Apparatus for Defining Manhattan Power Grid Structures Having a Reduced Number of Vias," filed Jun. 1, 2003 and hereby expressly incorporated herein by reference. The above described embodiments may also be combined with arrangements of vias in via arrays where diagonal wiring paths are facilitated near the edges of the via arrays, as described in the aforementioned U.S. patent application entitled "Methods and Apparatus for Defining Manhattan Power Grid Structures Having a Reduced Number of Vias."

In addition, the above described embodiments may be combined with methods for defining power grid structures having diagonal stripes placed on one or more layers of an IC or with methods for defining power stripes having non-uniform widths and/or non-uniform spacing widths on a layer of the IC. Such methods are described in U.S. patent application Ser. No. 10/452,848, entitled "Methods and Apparatus for Defining Power Grid Structures Having Diagonal Stripes," filed Jun. 1, 2003 with and hereby expressly incorporated herein by reference.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A power grid structure for an integrated circuit, the power grid structure having at least one design constraint that defines a minimum specification that the power grid structure must meet in order to be acceptable for use in the integrated circuit, the power grid structure comprising:
   a plurality of stripes, each stripe having a minimal width required for the power grid structure to meet the at least one design constraint;
   a plurality of rails; and
   a plurality of vias that connect the plurality of stripes to the plurality of rails, wherein the plurality of vias are positioned in a plurality of arrangements, wherein a first arrangement for a first set of vias is different than a second arrangement for a second set of vias, wherein the first arrangement is for reducing diagonal wiring blockage for a layer of the integrated circuit.

2. A power grid structure for an integrated circuit, the power grid structure having at least one design constraint that defines a minimum specification that the power grid structure must meet in order to be acceptable for use in the integrated circuit, the power grid structure comprising:
   a plurality of stripes, each stripe having a minimal width required for the power grid structure to meet the at least one design constraint, wherein each stripe comprises a first spacing width;
   a plurality of rails wherein each rail has a minimal width required for the power grid structure to meet the at least one design constraint, wherein each rail comprises a second spacing width, wherein the first spacing width is proportional to the second spacing width; and
   a plurality of vias that connect the plurality of stripes to the plurality of rails.

3. The power grid structure of claim 2, wherein proportionality between the first spacing width for each stripe and the second spacing width for each rail reduces diagonal wiring blockage for a layer of the integrated circuit.

4. A power grid structure for an integrated circuit, wherein the integrated circuit comprises a first Manhattan layer and a second diagonal layer, the power grid structure having at least one design constraint that defines a minimum specification that the power grid structure must meet in order to be acceptable for use in the integrated circuit, the power grid structure comprising:
- a plurality of stripes, each stripe having a minimal width required for the power grid structure to meet the at least one design constraint;
- a plurality of rails; and
- a plurality of vias that connect the plurality of stripes to the plurality of rails, wherein the plurality of vias are positioned to (i) reduce Manhattan wiring blockage for the first Manhattan layer, and (ii) reduce diagonal wiring blockage for the second diagonal layer.

5. A method for defining a power grid structure for an integrated circuit, wherein the power grid structure is comprised of power grid structure components, the method comprising:
- defining a set of attributes for the power grid structure based on a set of design constraints;
- defining a set of routes for the power grid structure based on the set of attributes;
- verifying the set of attributes and the set of routes to determine whether the set of attributes and the set of routes meet the set of design constraints; and
- iteratively (i) defining the set of attributes, (ii) defining the set of routes, and (iii) verifying the set of attributes and the set of routes.

6. The method of claim 5, wherein the iteration is performed until the set of design constraints is met.

7. The method of claim 6, wherein before each iteration, further comprising modifying at least one design constraint from the set of design constraints.

8. The method of claim 7, wherein the modifying comprises decreasing minimum area, maximum area, or minimum and maximum area that the power grid structure components can occupy on a first layer.

9. The method of claim 6, wherein after the set of design constraints is met, further comprising
- defining a plurality of signal routes;
- determining whether the plurality of signal routes meets a set of criteria; and
- when the plurality of signal routes does not met the set of criteria, iteratively (i) modifying the set of design constraints, (ii) defining the set of attributes, (iii) defining the set of routes, and (iv) verifying the set of attributes and the set of routes.

10. The method of claim 9, wherein the determining whether the plurality of signal routes meets a set of criteria comprises determining whether wiring demand on a first layer of the integrated circuit exceeds wiring capacity on the first layer, the wiring capacity of the first layer being determined by the area that the power grid structure components occupy on the first layer.

11. The method of claim 5, wherein the defining the set of attributes comprises defining dimensions for the power grid structure components.

12. The method of claim 5, wherein defining the set of attributes comprises defining locations for the power grid structure components.

13. The method of claim 5, wherein defining the set of attributes comprises using a power grid formula, an objective for the power grid formula and the set of design constraints.

14. The method of claim 5, wherein the integrated circuit comprises a plurality of layers, where the set of design constraints comprises a particular design constraint for each layer.

15. The method of claim 14, wherein (i) defining the set of attributes, and (ii) defining the set of routes are performed for each layer of the integrated circuit.

16. The method of claim 5, wherein the set of attributes for the power grid structure components are defined by using a solver program.

17. The method of claim 5, wherein the set of design constraints comprises a threshold voltage drop across the power grid structure, a threshold voltage required at each electronic or circuit component of the integrated circuit, a switching frequency threshold of the integrated circuit, a threshold electro-migration value, or a threshold switching noise value.

18. The method of claim 5, wherein the set of design constraints specify minimum and maximum areas that the power grid structure components can occupy on a first layer of the integrated circuit.

19. The method of claim 5, wherein the power grid structure produced reduces diagonal wiring blockage for at least one layer of the integrated circuit.

20. A computer readable medium storing a computer program for defining a power grid structure for an integrated circuit, wherein the power grid structure is comprised of power grid structure components, the computer program executable by at least one processor, the computer program comprising a set of instructions for:
- defining a set of attributes for the power grid structure based on a set of design constraints;
- defining a set of routes for the power grid structure based on the set of attributes;
- verifying the set of attributes and the set of routes to determine whether the set of attributes and the set of routes meet the set of design constraints; and
- iteratively (i) defining the set of attributes, (ii) defining the set of routes, and (iii) verifying the set of attributes and the set of routes.

21. The computer readable medium of claim 20, wherein the iteration is performed until the set of design constraints is met.

22. The computer readable medium of claim 20, wherein the computer program further comprises a set of instructions for modifying at least one design constraint from the set of design constraints before each iteration.

23. The computer readable medium of claim 20, wherein the power grid structure produced reduces diagonal wiring blockage for at least one layer of the integrated circuit.

* * * * *